(12) United States Patent
Takahashi

(10) Patent No.: US 8,521,225 B2
(45) Date of Patent: Aug. 27, 2013

(54) COMMUNICATION SYSTEM, CONTROL METHOD THEREOF, TERMINAL STATION, AND COMPUTER-READABLE STORAGE MEDIUM

(75) Inventor: Takumi Takahashi, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 721 days.

(21) Appl. No.: 12/425,709

(22) Filed: Apr. 17, 2009

(65) Prior Publication Data

US 2009/0268682 A1  Oct. 29, 2009

(30) Foreign Application Priority Data

Apr. 25, 2008  (JP) ................. 2008-116300

(51) Int. Cl.
*H04B 1/38* (2006.01)

(52) U.S. Cl.
USPC .......... 455/557; 455/450; 455/41.2; 455/509; 455/414.1

(58) Field of Classification Search
USPC ....................... 455/557, 450, 41.2, 509, 414.1
See application file for complete search history.

(56) References Cited

U.S. PATENT DOCUMENTS

| | | | | |
|---|---|---|---|---|
| 4,878,123 A | 10/1989 | Miura et al. | ................... | 358/401 |
| 5,650,862 A | 7/1997 | Shimizu et al. | ............... | 358/448 |
| 5,787,308 A | 7/1998 | Suzuki et al. | ................ | 395/839 |
| 7,376,738 B2 * | 5/2008 | Snyder | .......................... | 709/226 |
| 2004/0252723 A1 | 12/2004 | Tatsumoto et al. | ........... | 370/477 |
| 2005/0237956 A1 * | 10/2005 | Kuperschmidt et al. | ...... | 370/310 |

FOREIGN PATENT DOCUMENTS

| | | | |
|---|---|---|---|
| JP | 07-099526 A | 4/1995 | |
| JP | 2005-012260 A | 1/2005 | |

OTHER PUBLICATIONS

"High Rate Ultra Wideband PHY and MAC Standard," Standard ECMA 368, 3rd Edition, Dec. 2008, pp. 1-330.
"Wireless Universal Serial Bus Specification," Revision 1.0, May 12, 2005, pp. 1-293.

* cited by examiner

*Primary Examiner* — Nghi H Ly
(74) *Attorney, Agent, or Firm* — Fitzpatrick, Cella, Harper & Scinto

(57) ABSTRACT

A terminal station having a first mode to control communication and a second mode in which the communication is controlled by a terminal station operating in the first mode, comprising: a connection unit configured to connect the terminal station operating in the second mode to other terminal station operating in the first mode; and an acquisition unit configured to acquire a communication band from the other terminal station connected by the connection unit when starting an operation in the first mode.

14 Claims, 18 Drawing Sheets

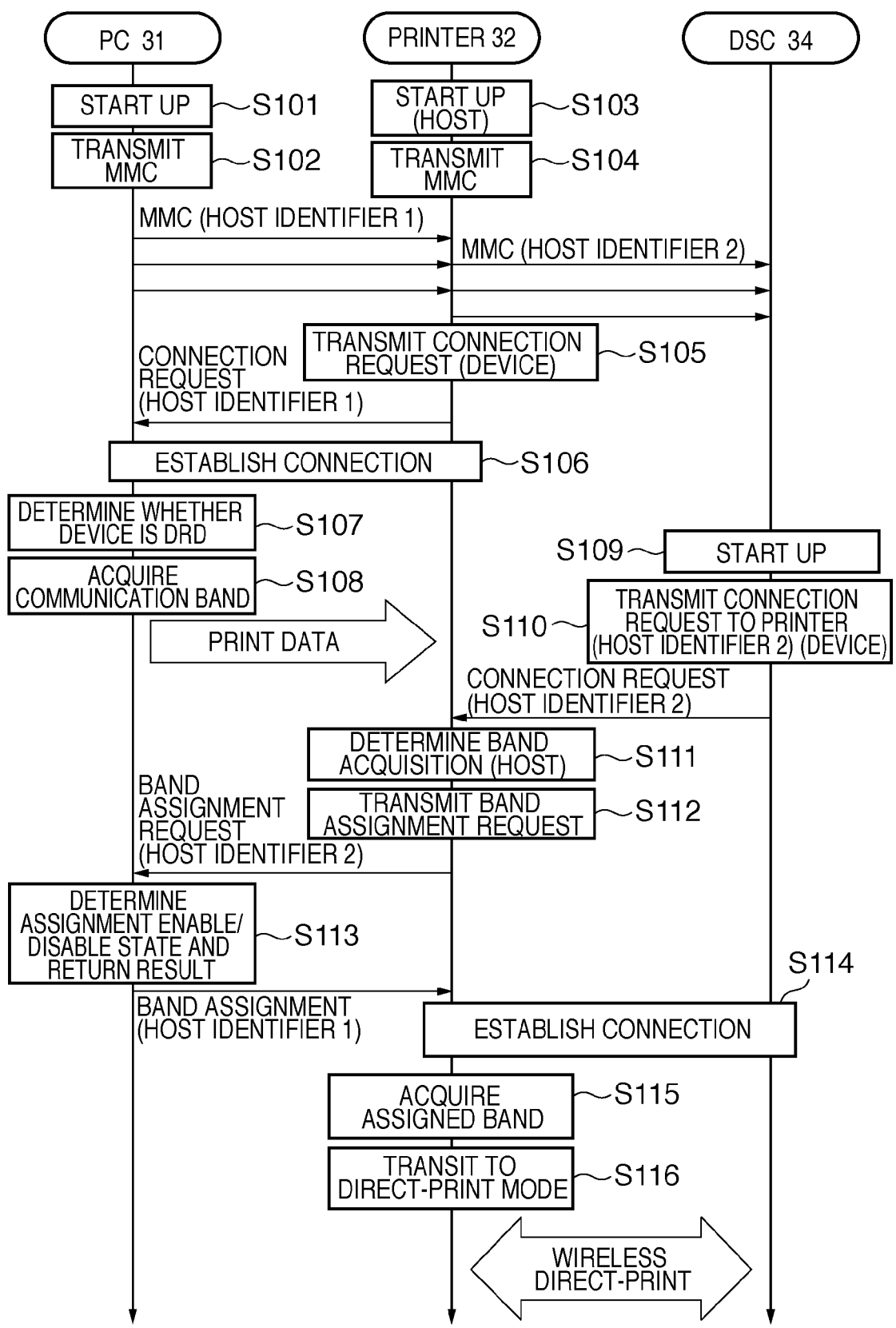

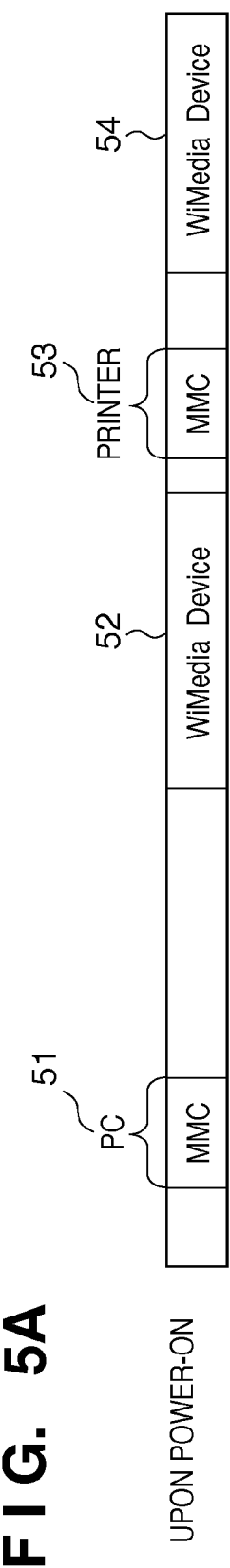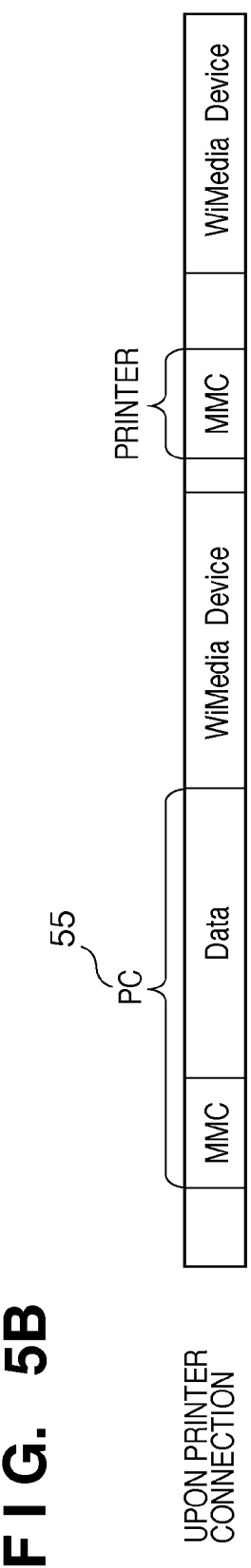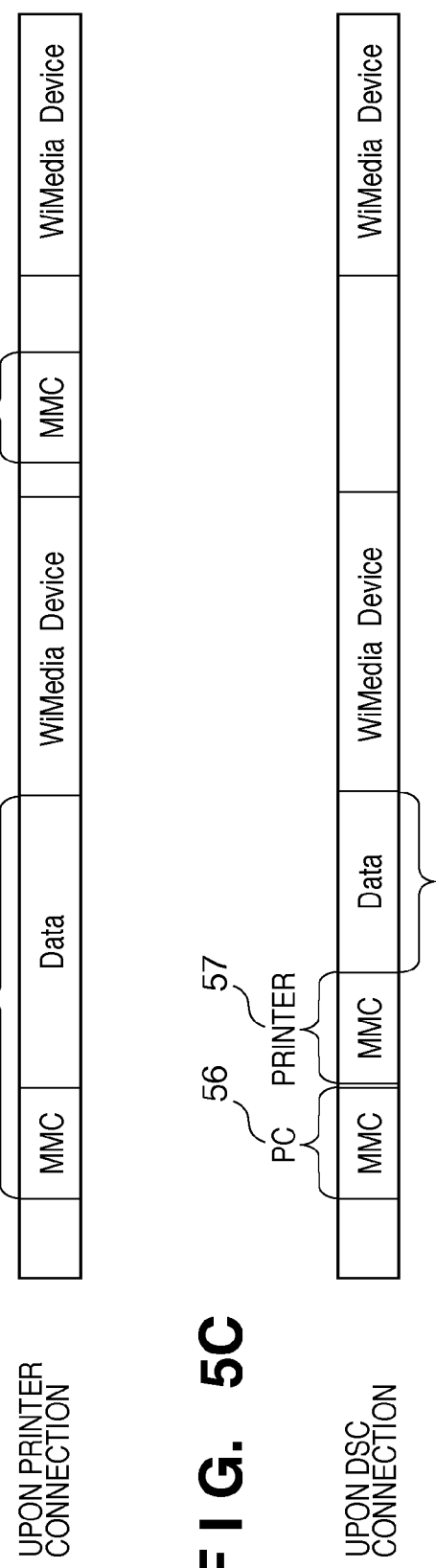

BP : Beacon Period
MAS : Media Access Slot
MMC : Micro-scheduled Management Commands F I G. 16
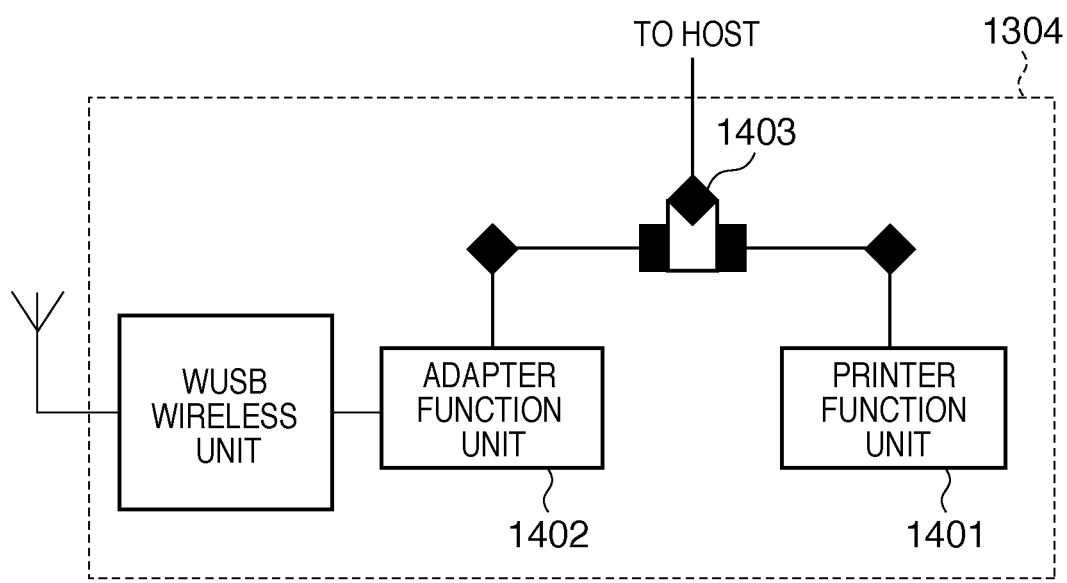

F I G. 17
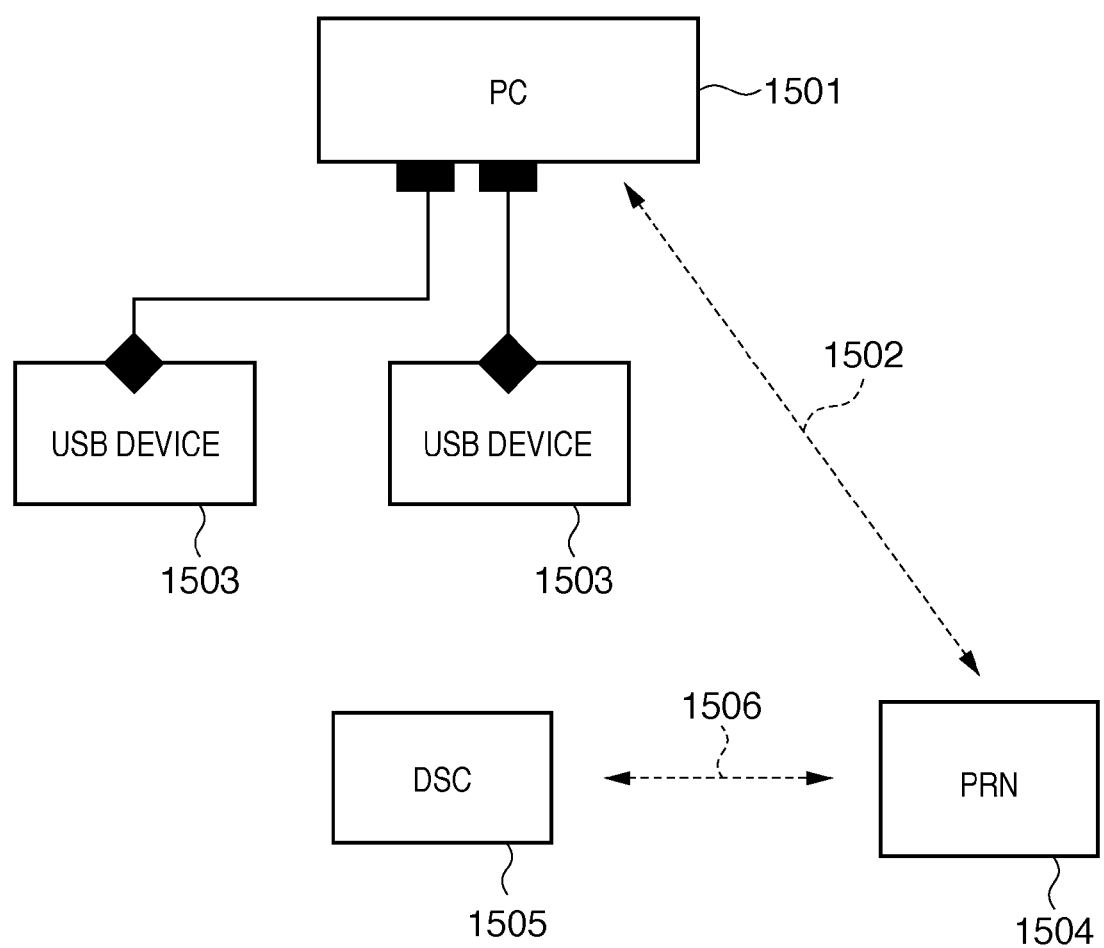

COMMUNICATION SYSTEM, CONTROL METHOD THEREOF, TERMINAL STATION, AND COMPUTER-READABLE STORAGE MEDIUM

BACKGROUND OF THE INVENTION

1. Field of the Invention

The present invention relates to a communication system, a control method thereof, a terminal station, and a computer-readable storage medium.

2. Description of the Related Art

The need for wirelessly connecting not only computer peripheral devices but also consumer devices such as a digital still camera, cellular phone, and music player is growing.

A UWB (Ultra Wide Band) wireless method is a wireless communication method for implementing a WPAN (Wireless Personal Area Network) with a high data transfer rate. For example, a UWB method complying with technical specifications defined by the FCC (Federal Communication Commission) in 2002 uses a very wide frequency band of 3.1 to 10.6 GHz. Additionally, the ecma-368 standard is developed as technical specifications concerning the physical layer and the media access function of WPAN using UWB (ecma, High Rate Ultra Wideband PHY and MAC Standard, December, 2005). The UWB physical layer defined by this standard uses an OFDM (multi-band OFDM: Orthogonal Frequency Division Multiplexing) method. In the OFDM method, an OFDM modulated signal having a bandwidth of 528 MHz causes frequency-hopping. This method implements a WPAN system having a data transmission rate of 480 Mbps at maximum.

The ecma-368 standard assumes USB, IEEE1394, or IP protocol as the upper-level protocol. The USB standard setting body has also developed the WUSB (Wireless USB) standard that is a wireless USB connection standard (USB-IF, "Wireless Universal Serial Bus, Revision 1.0", May, 2005).

USB by wired connection will be explained. FIG. 9 is a block diagram showing an example of a system arrangement using USB. In this system arrangement, a USB host 71 serving as a control device is connected to one or more USB devices 72 serving as peripheral devices via USB cables 73 to form a star network. The USB can also form a tree-shaped topology by using a branching device called a hub 74.

Conventionally, the USB has been developed as an interface to connect a personal computer to a peripheral device. A personal computer serves as a host, and a peripheral device such as a printer or a scanner serves as a device in general. In recent years, however, many devices other than personal computers are also getting the USB host function. An example is a direct-print method of connecting a digital still camera (DSC) to a printer and causing it to print an image from the digital still camera. In this case, the printer operates as a host, and the digital still camera operates as a device. Hence, the printer having the direct-print function has both a USB device port which connects the printer serving as a device to a personal computer and a USB host port which connects the printer serving as a host to the digital still camera.

FIG. 10 is a block diagram showing an example of the system arrangement of the direct-print method. A printer 82 includes both a USB device port 85 and a USB host port 86. The USB device port 85 of the printer 82 is connected to a personal computer 81 via a USB cable 83. In this case, the personal computer 81 operates as the host of the printer 82.

To connect the printer 82 to a digital still camera 84 to perform direct-print, the user connects the digital still camera 84 to the USB host port 86 of the printer 82 using a USB cable. At this time, the printer 82 operates as the host of the digital still camera 84.

The operation of the WUSB will be described next. FIG. 11 is a block diagram showing an example of a system arrangement using WUSB. In this system arrangement, a WUSB host 91 is connected to WUSB devices 93 to 95 via WUSB wireless links 92. An example of the WUSB host 91 is a personal computer. Examples of the WUSB devices 93 to 95 are a printer, scanner, hard disk drive, and digital still camera. The WUSB host 91 and the WUSB devices 93 to 95 exchange wireless frames using the WUSB wireless links 92, thereby executing data transfer.

FIG. 12 is a timing chart showing the timings of wireless frames transmitted via the WUSB wireless links 92 shown in FIG. 11. Note that the timings of wireless frames shown in FIG. 12 conform to a protocol defined by the WUSB standard.

Data transfer in the WUSB starts at a broadcast frame 1001 transmitted from the WUSB host 91. The broadcast frame 1001 includes a unique identifier to identify the WUSB host 91. The identifier is a value uniquely assigned to the WUSB host 91, and is called a CHID (Connection Host ID) in the WUSB standard. This identifier is registered in advance in the WUSB devices 93 to 95 connectable to the WUSB host 91 having the identifier. A method of registering such a WUSB host identifier is defined by the Association Model that is an associated standard of WUSB. A detailed description of the identifier registration method will be omitted. Each of the WUSB devices 93 to 95 detects the identifier, thereby searching for the connectable WUSB host 91.

After the WUSB host 91 has transmitted the broadcast frame 1001, the WUSB host 91 transfers data to the WUSB devices 93 to 95. A wireless frame 1002 is transferred from the WUSB host 91 to the WUSB device 93. A wireless frame 1003 is transferred from the WUSB host 91 to the WUSB device 94. A wireless frame 1004 is transferred from the WUSB host 91 to the WUSB device 95. The broadcast frame 1001 includes pieces of time information that designate time slots to transmit the wireless frames 1002, 1003, and 1004. Upon receiving the broadcast frame 1001, each of the WUSB devices 93 to 95 analyzes the time information, and receives the wireless frame designated to it at an appropriate timing.

Next, each of the WUSB devices 93 to 95 transfers data to the WUSB host 91. A wireless frame 1005 is transferred from the WUSB device 93 to the WUSB host 91. A wireless frame 1006 is transferred from the WUSB device 94 to the WUSB host 91. A wireless frame 1007 is transferred from the WUSB device 95 to the WUSB host 91. The broadcast frame 1001 also includes pieces of time information that designate time slots to transmit the wireless frames 1005, 1006, and 1007. Upon receiving the broadcast frame 1001, each of the WUSB devices 93 to 95 analyzes the time information, and transmits the wireless frame at an appropriate timing. This enables to prevent collision of wireless frames. The WUSB protocol thus controls to make all WUSB devices smoothly communicate by referring to the identifier and frame transmission/reception timing information included in the broadcast frame transmitted from the WUSB host.

The WUSB host ensures a band using the DRP (Distributed Reservation Protocol) method of the ecma-368 standard to communicate with each WUSB device. FIG. 13 is a view showing a wireless frame of a MAC layer defined by the ecma-368 standard. The wireless frame includes a plurality of super frames 1101 to 1103 repeatedly. One super frame has a length of 65.536 ms, and is divided into 256 slots called media access slots (MASs) 1105 at an interface of 256 μs. A period called a beacon period (BP) 1104 and having a variable length is located at the start of the super frame. The beacon period 1104 can use 32 MASs at maximum. The beacon period 1104 has a role of transmitting various kinds of control information. The WUSB host or WUSB device announces the control information of its own to other devices during, e.g., this period. The media access slots 1105 except the beacon period 1104 are assigned to data transmission. The ecma-368 standard defines two data transmission methods: the PCA (Prioritized Contention Access) method and the DRP method.

In the PCA method, data transmission can freely be done outside the beacon period 1104 and DRP-reserved media access slots 1105. To the contrary, the DRP method reserves in advance MASs to be used for transmission (this information is sent to other devices by a beacon in the beacon period 1104), and performs data transmission only in the determined time period. In FIG. 13, the WUSB host ensures the band necessary for communication with WUSB devices as DRPs #1 1106 to #3 1108 each including several media access slots 1105.

Each of the DRPs #1 1106 to #3 1108 shown in FIG. 13 includes information called MMCs (Micro-scheduled Management Commands) 1109 to 1111. An MMC holds information to identify the WUSB host and a time to the next MMC in a sequence (i.e., link). The series of links ensures the transmission band for data communication between the WUSB host and a WUSB device.

As described above, the WUSB standard defines the DRP method as a method to be used by the WUSB host and the WUSB device to ensure the band for data communication. The standard also defines to make WUSB hosts adjust collision upon band acquisition using a perfect distributed control method.

Techniques of solving collision in band acquisition have been proposed conventionally. For example, a technique is known which, if an unused communication band is short, reduces the already set communication bands of other communication connections, thereby ensuring the necessary band (Japanese Patent Laid-Open No. 07-099526). There is also known another technique which, if band ensuring has failed due to a shortage of band, reduces the band ensured by another device connected to the transmission path, and ensures the freed band (Japanese Patent Laid-Open No. 2005-012260).

The WUSB is also usable for direct-print. FIG. 14 is a block diagram showing an example of the system arrangement of the direct-print method using the WUSB. In this system arrangement, a printer 1201 serving as a WUSB host is connected to a digital still camera 1202 serving as a WUSB device by wireless direct-print 1203. This arrangement allows the printer 1201 to print an image from the digital still camera 1202.

Wireless frame exchange in direct-print also conforms to the operation of the WUSB protocol shown in FIGS. 12 and 13.

In some product forms, a USB device incorporates an adapter function as shown in FIG. 15. In this system arrangement, a printer 1304 having a wireless hub function is connected to a personal computer 1301 via a USB cable 1303. FIG. 16 is a block diagram showing an example of the internal arrangement of the printer 1304 shown in FIG. 15. The printer 1304 incorporates a wired USB hub 1403. A printer function 1401 and an adapter function 1402 are connected to the hub 1403.

A printer 1504 shown in FIG. 17 performs wireless communication with a personal computer 1501. The printer 1504 also has a wireless direct-print function for a digital still camera. The printer 1504 operating as a WUSB device is wirelessly connected, via a WUSB wireless link 1502, to the personal computer 1501 operating as a WUSB host. The printer 1504 can also execute wireless direct-print 1506 with a digital still camera 1505.

FIG. 18 is a block diagram showing an example of the internal arrangement of the printer 1504 shown in FIG. 17. A wireless function switching unit 1601 selects a device function unit 1602 or a direct-print function unit 1603, and is connected to a WUSB wireless unit 1604. A print function switching unit 1605 selects the device function unit 1602 or the device function unit 1602, and is connected to a print function unit 1606.

If the printer 1504 operates as a WUSB device of the personal computer 1501, the wireless function switching unit 1601 selects the device function unit 1602.

If the printer 1504 executes wireless direct-print, the wireless function switching unit 1601 and the print function switching unit 1605 select the direct-print function unit 1603. The print function unit 1606 is thus connected to the digital still camera 1505 via the direct-print function unit 1603.

As described above, there can be a device having both the WUSB device function and the WUSB host function. Such a device is called a DRD (Dual-Role Device). If a DRD is, e.g., a printer, it operates as both a peripheral device of a personal computer and a host that controls wireless direct-print.

The WUSB standard defines a band acquisition method using the DRP method and an obligation to free an unused band. However, there is no specific definition about the timing when a WUSB host should ensure a band for a WUSB device by the DRP method. For this reason, it may be impossible to acquire a band when, for example, a DRD operating as a WUSB device is going to switch the operation to that of a WUSB host. A detailed example of the case will be described with reference to FIG. 17.

The personal computer 1501 operating as a WUSB host acquires a communication band using the DRP method when connecting to the printer 1504 operating as a WUSB device, and communicates with the printer 1504 using the communication band. Assume that in this state, the printer 1504 and the digital still camera 1505 establish connection to perform wireless direct-print. In this case, the printer 1504 operating as a WUSB device changes to a WUSB host by the DRD function of its own, and newly ensures a communication band for the digital still camera 1505. This communication band cannot be acquired in advance. It can be acquired only when the printer 1504 actually starts connection to the digital still camera 1505.

Band acquisition by a WUSB host is managed by each WUSB host using distributed control. If an acquisition target band collides with another WUSB host, the WUSB hosts adjust it. For example, when a number of WUSB hosts and WUSB devices exist in the periphery, and they have already occupied the bands, negotiations with the other WUSB hosts start to ask for band assignment. However, these negotiations need not always lead to band assignment. That is, even when a printer having a DRD function changes to a WUSB host for wireless direct-print, it may be unable to ensure a band.

SUMMARY OF THE INVENTION

The present invention enables provides a technique of allowing a terminal station which is operating in a second mode (device function) and is going to operate in a first mode (host function) to acquire a communication band.

According to a first aspect of the present invention, there is provided a communication system including a first terminal station which has a host function of controlling communication, and a device function controlled by the host function, and a second terminal station which operates by the host function, the second terminal station comprising: a determination unit configured to determine whether a connected terminal station is the first terminal station; and a control unit configured to, if the terminal station determined to be the first terminal station by the determination unit has acquired no communication band yet when starting an operation by the host function, assign at least part of a communication band acquired by the second terminal station to the first terminal station, and the first terminal station comprising: a host unit configured to operate by the host function when the first terminal station connected to the second terminal station by the device function has received a connection request from a third terminal station which operates by the device function; and an acquisition unit configured to, when starting an operation by the host function, acquire the communication band assigned by the second terminal station as a communication band for the third terminal station.

According to a second aspect of the present invention, there is provided a control method in a communication system including a first terminal station which has a host function of controlling communication, and a device function controlled by the host function, and a second terminal station which operates by the host function, comprising: causing the second terminal station to assign at least part of a communication band acquired by the second terminal station to the first terminal station when the first terminal station connected to the second terminal station by the device function starts an operation by the host function; and causing the first terminal station to acquire the communication band assigned by the second terminal station when the first terminal station connected to the second terminal station by the device function starts an operation by the host function.

Further features of the present invention will become apparent from the following description of exemplary embodiments with reference to the attached drawings.

BRIEF DESCRIPTION OF THE DRAWINGS

FIG. 4 is a sequence chart showing an example of the connection operation sequence of the communication system shown in FIG. 1;

FIGS. 5A to 5C are views showing examples of the band occupation state of the communication system shown in FIG. 1;

FIG. 16 is a block diagram showing an example of the internal arrangement of a printer 1304 shown in FIG. 15;

FIG. 17 is a block diagram showing an example of a system arrangement using USB and WUSB.

DESCRIPTION OF THE EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment

Figure 1:
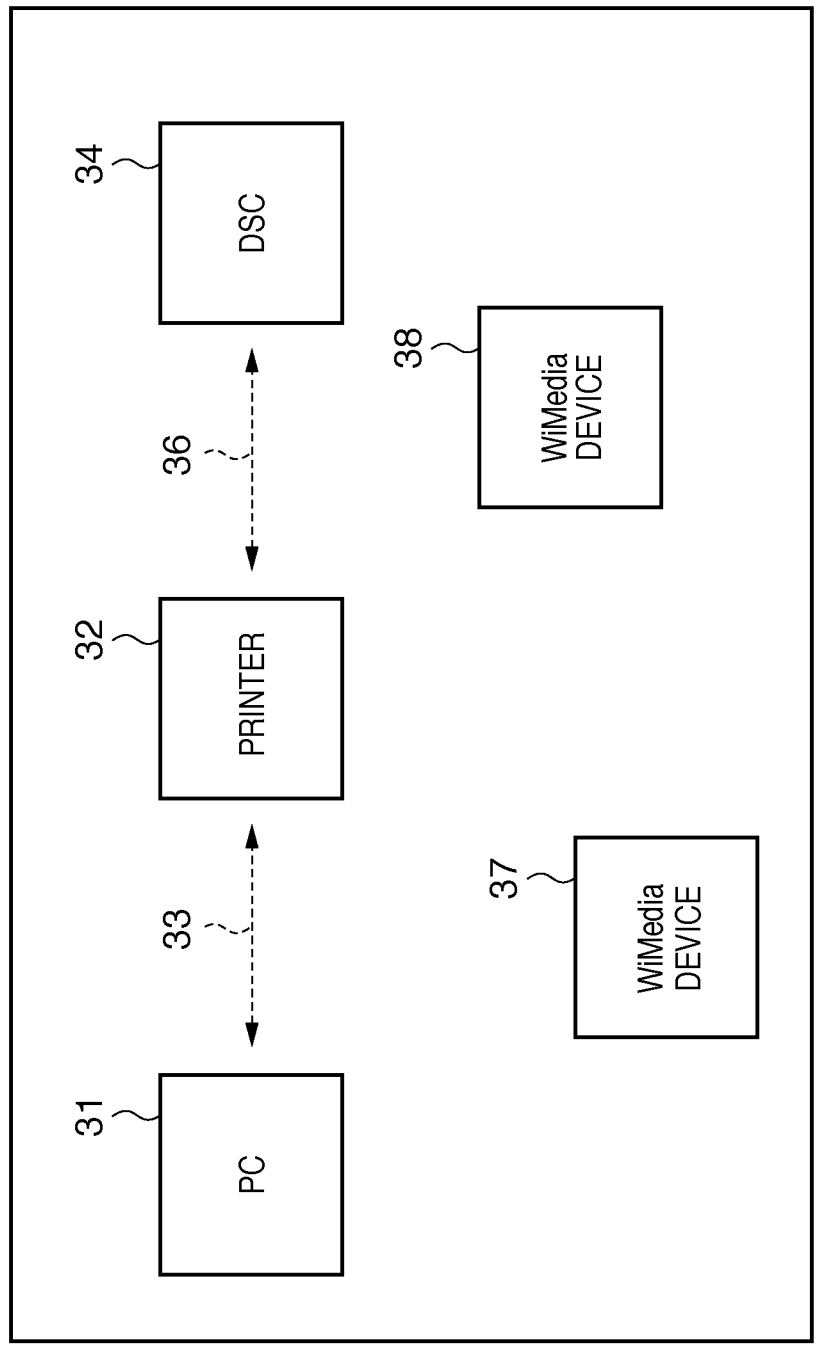
FIG. 1 is a block diagram showing an example of the overall arrangement of a communication system according to the present invention.

FIG. 1 is a block diagram showing an example of the overall arrangement of a communication system according to the present invention.

This communication system performs wireless communication using WUSB. A communication band to be used in the communication is acquired by the DRP method. Band acquisition in this communication system is managed by each WUSB host using perfect distributed control. If an acquisition target band collides with another WUSB host, the WUSB hosts adjust it.

WiMedia devices 37 and 38 are arranged near the communication system, e.g., within the WUSB radio wave coverage. The WiMedia devices 37 and 38 also have the WUSB communication function. One of them functions as a host, and the other functions as a device, thereby forming communication by WUSB.

The communication system includes a printer 32 serving as a first terminal station, a PC 31 serving as a second terminal station, and a DSC 34 serving as a third terminal station. The first terminal station has both a first mode in which the terminal station functions as a WUSB host to control the communication interface (WUSB interface in this embodiment) and a second mode in which the terminal station functions as a WUSB device.

The second terminal station has at least the first mode in which it functions as a WUSB host. The third terminal station has at least the second mode in which it functions as a WUSB device. The terminal station that operates in the second mode is controlled by the host function of the terminal station that operates in the first mode.

The PC 31 is a terminal station having the first mode in which it functions as a WUSB host. The PC 31 of this embodiment is assumed to function only as a WUSB host but not function as a WUSB device. The DSC 34 is a terminal station having the second mode in which it functions as a WUSB device. The DSC 34 of this embodiment is assumed to function only as a WUSB device but not function as a WUSB host.

The printer 32 is a DRD having both the first mode in which it functions as a WUSB host and the second mode in which it functions as a WUSB device. When the printer 32 communicates with the PC 31 by WUSB, the printer 32 functions as a device, whereas the PC 31 functions as a host. When the printer 32 communicates with the DSC 34 by WUSB, the printer 32 functions as a host, whereas the DSC 34 functions as a device.

An example of the system arrangement of the communication system has been described above. Each of the above-described PC 31, printer 32, and DSC 34 incorporates, e.g., a computer. The computer includes a main control unit such as a CPU, and storage units such as a ROM (Read Only Memory), a RAM (Random Access Memory), and an HDD (Hard Disk Drive). The computer also includes input/output units such as a keyboard, a mouse, and a display or touch panel. These components are connected via a bus and controlled by causing the main control unit to execute programs stored in the storage units.

Figure 2:
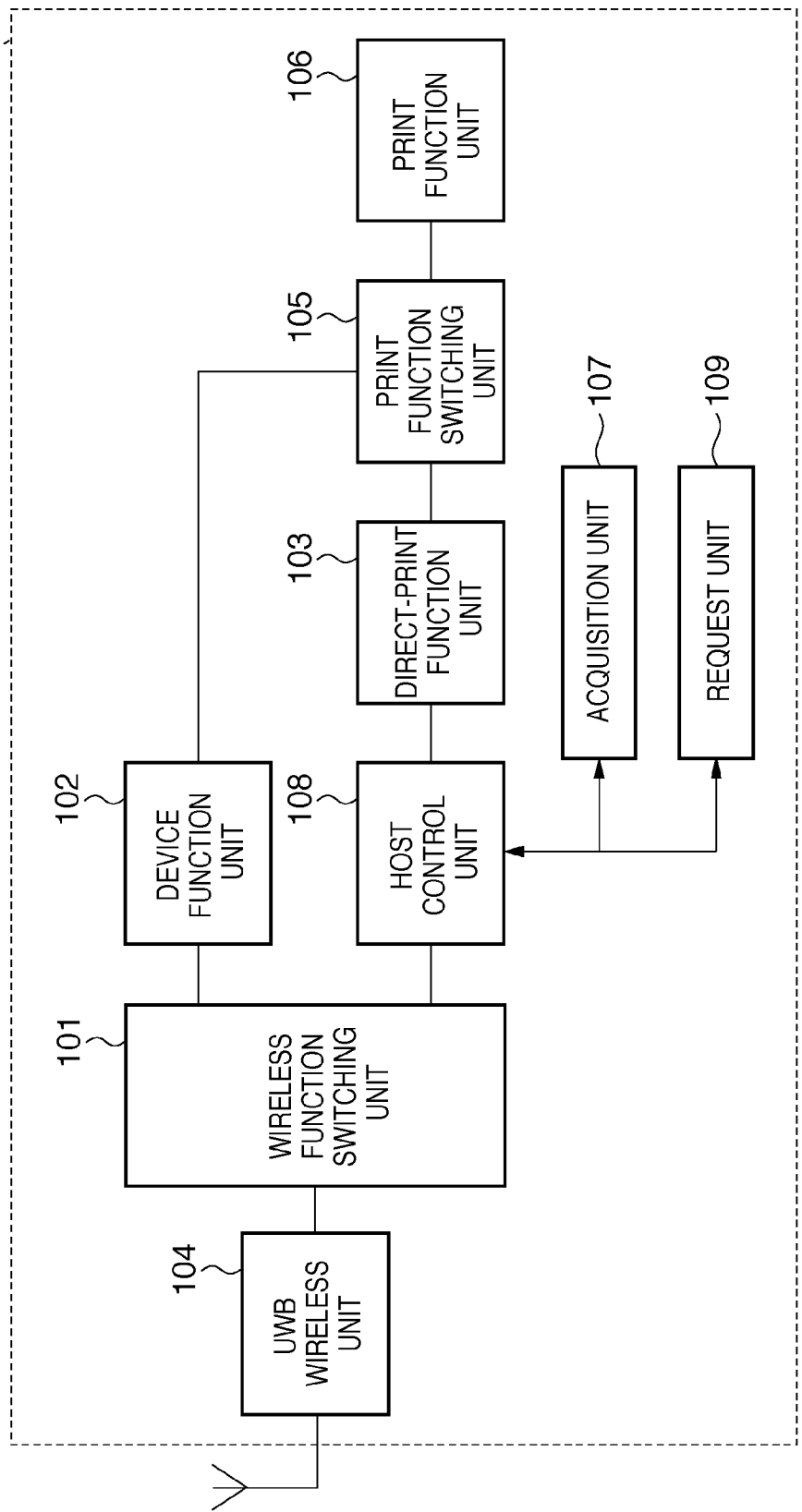
FIG. 2 is a block diagram showing an example of the functional arrangement of a printer 32 shown in FIG. 1.

An example of the functional arrangement of the printer 32 shown in FIG. 1 will be described next with reference to FIG. 2.

The printer 32 includes a wireless function switching unit 101, device function unit 102, direct-print function unit 103, UWB wireless unit 104, print function switching unit 105, print function unit 106, and host control unit 108. The printer 32 also includes an acquisition unit 107, and a request unit 109.

The UWB wireless unit 104 controls the UWB wireless physical layer. The wireless function switching unit 101 is placed above the UWB wireless unit 104, and serves as a MAC (Media Access Control) which adjusts, e.g., the transmission timings among a plurality of devices. The wireless function switching unit 101 also switches the mode to cause the printer 32 to operate as a device or a host.

The device function unit 102 causes the printer 32 to function as a WUSB device. The device function unit 102 holds information including protocols such as a device driver and a function driver to make the printer 32 operate as a WUSB device.

The host control unit 108 performs control to cause the printer 32 to function as a WUSB host. The host control unit 108 holds information including protocols such as a host driver and a class driver to make the printer 32 operate as a WUSB host.

When the printer 32 is connected to the DSC 34, the direct-print function unit 103 provides a direct-print function. The direct-print function unit 103 holds information including protocols necessary for printing data (e.g., image) sent from the DSC 34. Examples of the protocols are PTP (Picture Transfer Protocol) and DPS (Digital Photo Solution for Imaging Device).

The print function switching unit 105 switches the function of the printer 32 in accordance with the mode of the printer 32 which operates as a WUSB device or a WUSB host. For example, when the printer 32 operates as a WUSB host, the print function switching unit 105 enables the direct-print function.

The print function unit 106 executes printing by forming an image on, e.g., paper. When the printer 32 operates as a WUSB host, the acquisition unit 107 acquires a communication band for a WUSB device (e.g., DSC 34). Note that band acquisition by the acquisition unit 107 is performed using the DRP method.

Figure 3:
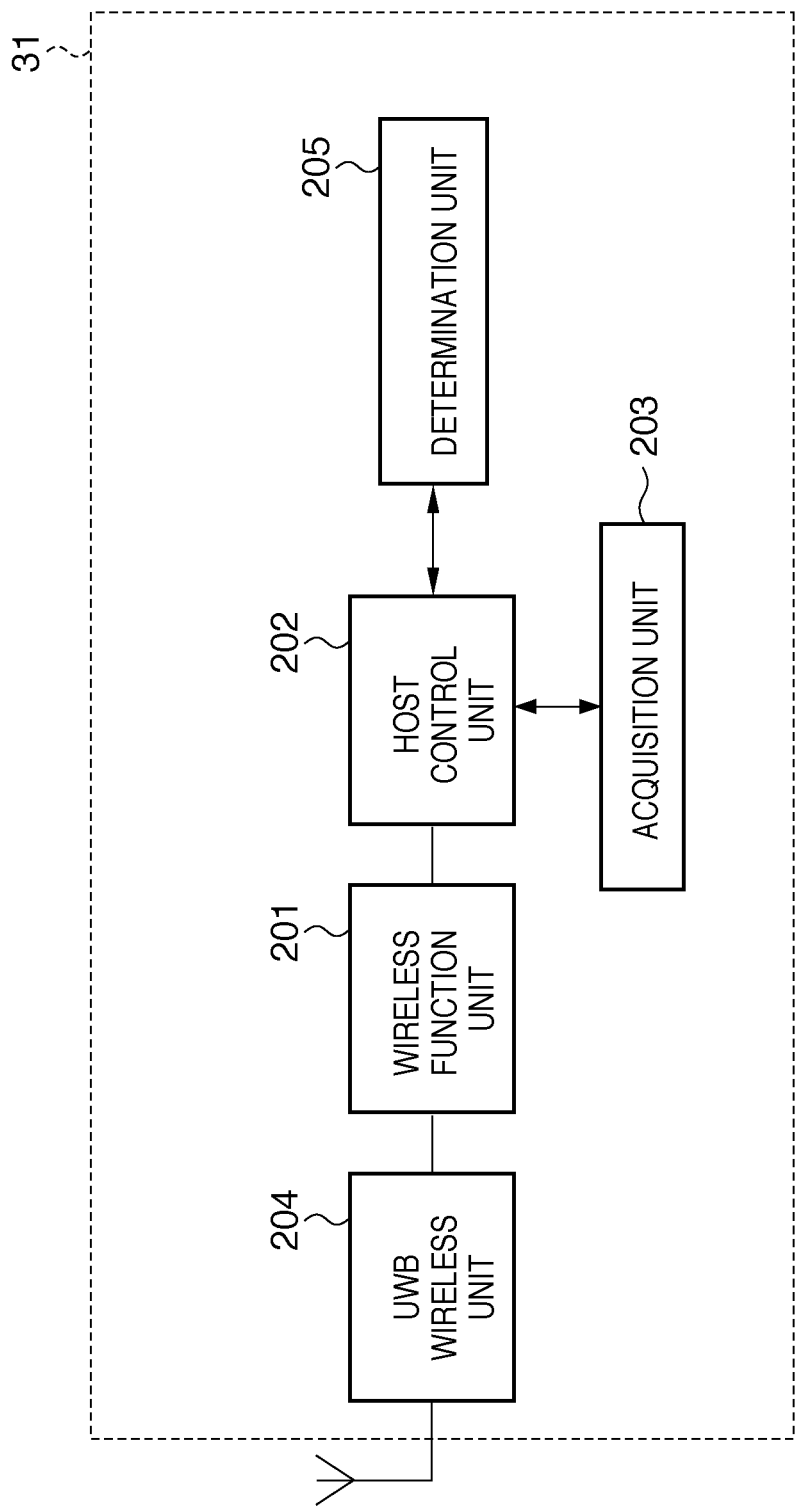
FIG. 3 is a block diagram showing an example of the functional arrangement of a PC 31 shown in FIG. 1.

An example of the functional arrangement of the PC 31 shown in FIG. 1 will be described next with reference to FIG. 3.

The PC 31 includes a wireless function unit 201, host control unit 202, acquisition unit 203, UWB wireless unit 204, and determination unit 205.

The UWB wireless unit 204 controls the UWB wireless physical layer. The wireless function unit 201 is placed above the UWB wireless unit 204, and serves as a MAC (Media Access Control) which adjusts, e.g., the transmission timings among a plurality of devices.

The host control unit 202 performs control to cause the PC 31 to function as a WUSB host. The host control unit 202 holds information including protocols such as a host driver and a class driver to make the PC 31 operate as a WUSB host.

The acquisition unit 203 acquires a communication band for a terminal station (e.g., printer 32 or DSC 34) operating as a WUSB device. Note that band acquisition by the acquisition unit 203 is performed using the DRP method.

The determination unit 205 determines whether a connection destination (or connected) terminal station is a DRD. This determination is done based on, e.g., a product identifier (information such as a model name or type name) obtained from a device descriptor or a received beacon.

An example of the connection operation sequence of the communication system shown in FIG. 1 will be described next with reference to FIG. 4.

First, the PC 31 and the printer 32 start up as WUSB hosts (steps S101 and S103). When powered on, the PC 31 (host identifier 1) causes the acquisition unit 203 to acquire a band necessary for MMC transmission. Since the PC 31 is not connected to any WUSB device yet at this point of time, only a band necessary for MMC transmission is ensured. When the band is ensured, the PC 31 causes the wireless function unit 201 to transmit an MMC, thereby announcing the peripheral devices that it has started up as a WUSB host (step S102).

When powered on, the printer 32 (host identifier 2) causes the acquisition unit 107 to acquire only a band necessary for MMC transmission by the DRP method, like the PC 31. When the band is ensured, the printer 32 causes the wireless function switching unit 101 to transmit an MMC, thereby announcing the peripheral devices that it has started up as a WUSB host (step S104). As the band occupation state at this point of time, the PC 31 and the printer 32 acquire bands 51 and 53 necessary for MMC transmission, as shown in FIG. 5A. The WiMedia devices 37 and 38 have already acquired bands 52 and 54. That is, the PC 31 and the printer 32 are already unable to use the bands 52 and 54.

The printer 32 functions as a WUSB device by the device function unit 102. The printer 32 also searches the periphery, detects the PC 31 based on the host identifier, and transmits a connection request to the PC 31 (step S105). When the PC 31 causes the host control unit 202 to return an acknowledgement to the printer 32 of the connection request source, connection between the printer 32 and the PC 31 is established (step S106).

When the connection is completed in this way, the PC 31 causes the determination unit 205 to determine whether the connected WUSB device is a DRD and store the result in, e.g., a RAM (step S107). After that, the PC 31 causes the host control unit 202 to acquire a band necessary for communication with the printer 32 again by the DRP method (step S108). Instead of acquiring a new band at this timing, the necessary band may be predicted and acquired upon powering on (the PC 31). As the band occupation state at this point of time, the PC 31 ensures a band (Data 55) necessary for transmitting data in addition to a MMC, as shown in FIG. 5B.

At this time, the DSC 34 is placed near the printer 32 and powered on by the user (step S109). The user also transits the DSC 34 to the direct-print mode to print a photo image stored in the DSC 34. The DSC 34 searches for connectable WUSB hosts (e.g., hosts connected in the past and existing in the periphery), and displays them on, e.g., the display. The user refers to the display and selects a WUSB host (the printer 32 in this case). In response to this, the DSC 34 transmits a connection request to the selected WUSB host (host identifier 2) (step S110).

Upon receiving the connection request, the printer 32 causes the wireless function switching unit 101 to switch its operation state from the second mode in which the printer functions as a WUSB device to the first mode in which the printer functions as a WUSB host. Upon this mode switching, the printer 32 causes the acquisition unit 107 to determine whether the necessary band can be acquired (step S111). Assume that the necessary band cannot be acquired. In this case, the printer 32 causes the request unit 109 to request the PC 31 to assign the necessary band (step S112).

Upon receiving the assignment request, the PC 31 causes the determination unit 205 to check whether the printer 32 of the band assignment request source is a DRD that is the current or past connection target of the PC 31. It is also checked whether the band acquired by the PC 31 is sufficiently wider than the band requested to be assigned. Based on the check result, the PC 31 notifies the printer 32 of the assignment enable/disable state (assignable/unassignable) (step S113).

Upon receiving an assignment enable notification from the PC 31, the printer 32 transmits an MMC to the assigned band, thereby establishing connection to the DSC 34 (step S114). After establishing the connection, the printer 32 causes the acquisition unit 107 to acquire the assigned band (step S115), and causes the print function switching unit 105 to transit itself to the direct-print mode (step S116). After that, direct-print is performed between the printer 32 and the DSC 34. As the band occupation state at this point of time, the printer 32 ensures bands 57 and 58 assigned by the PC 31, as shown in FIG. 5C. The assigned bands 57 and 58 are bands ensured by the PC 31 for communication with the printer 32. That is, they are unused bands for the PC 31 because the printer 32 is functioning as a host. As described above, in this embodiment, it is possible to effectively use the bands because exclusive bands (not to be used simultaneously) are assigned.

Figure 6:
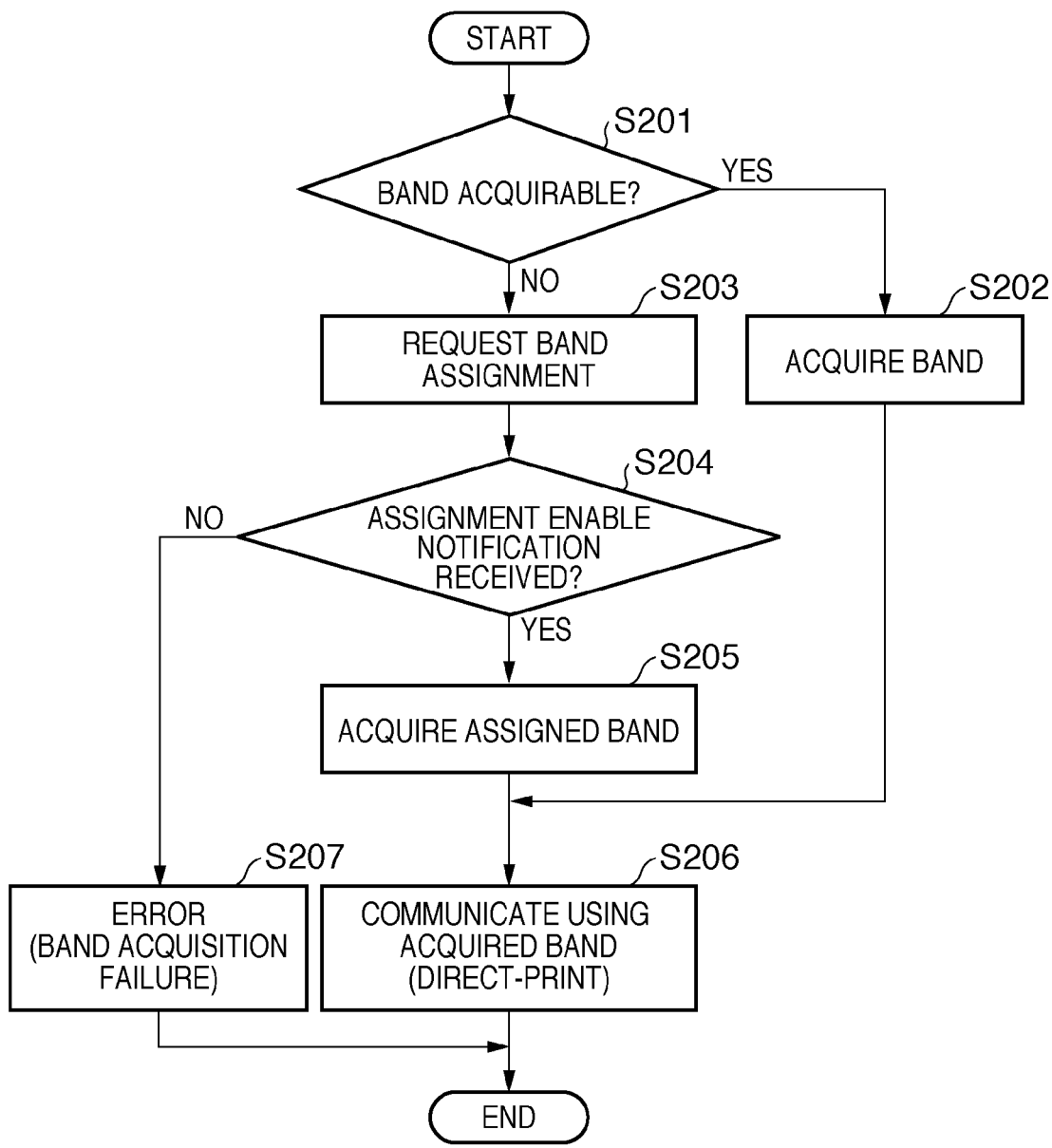
FIG. 6 is a flowchart showing an example of the operation of the printer 32 shown in FIG. 1.

An example of the operation of the printer 32 will be described next with reference to FIG. 6. An operation of the printer 32 when switching its operation state from the second mode in which it functions as a device to the first mode in which it functions as a host, and acquiring a band to communicate with the DSC 34 will be described.

The printer 32 causes the wireless function switching unit 101 to switch its operation state from the second mode in which it functions as a WUSB device to the first mode in which it functions as a WUSB host. In this mode switching, the printer 32 causes the acquisition unit 107 to determine whether the necessary band can be acquired. If the band can be acquired (YES in step S201), the printer 32 acquires the band (step S202), and causes the host control unit 108 to start communication (e.g., direct-print) using the band (step S206).

If the band cannot be acquired, i.e., if band acquisition has failed (NO in step S201), the printer 32 causes the request unit 109 to request the PC 31 to assign the necessary band (step S203). Upon receiving an assignment enable notification from the PC 31 in response to the request (YES in step S204), the printer 32 causes the acquisition unit 107 to acquire the assigned band (step S205). The printer 32 causes the host control unit 108 to start communication (e.g., direct-print) using the band (step S206). Upon receiving an assignment disable notification (NO in step S204), the printer 32 displays, e.g., an error message (e.g., band acquisition failure) (step S207).

Figure 7:
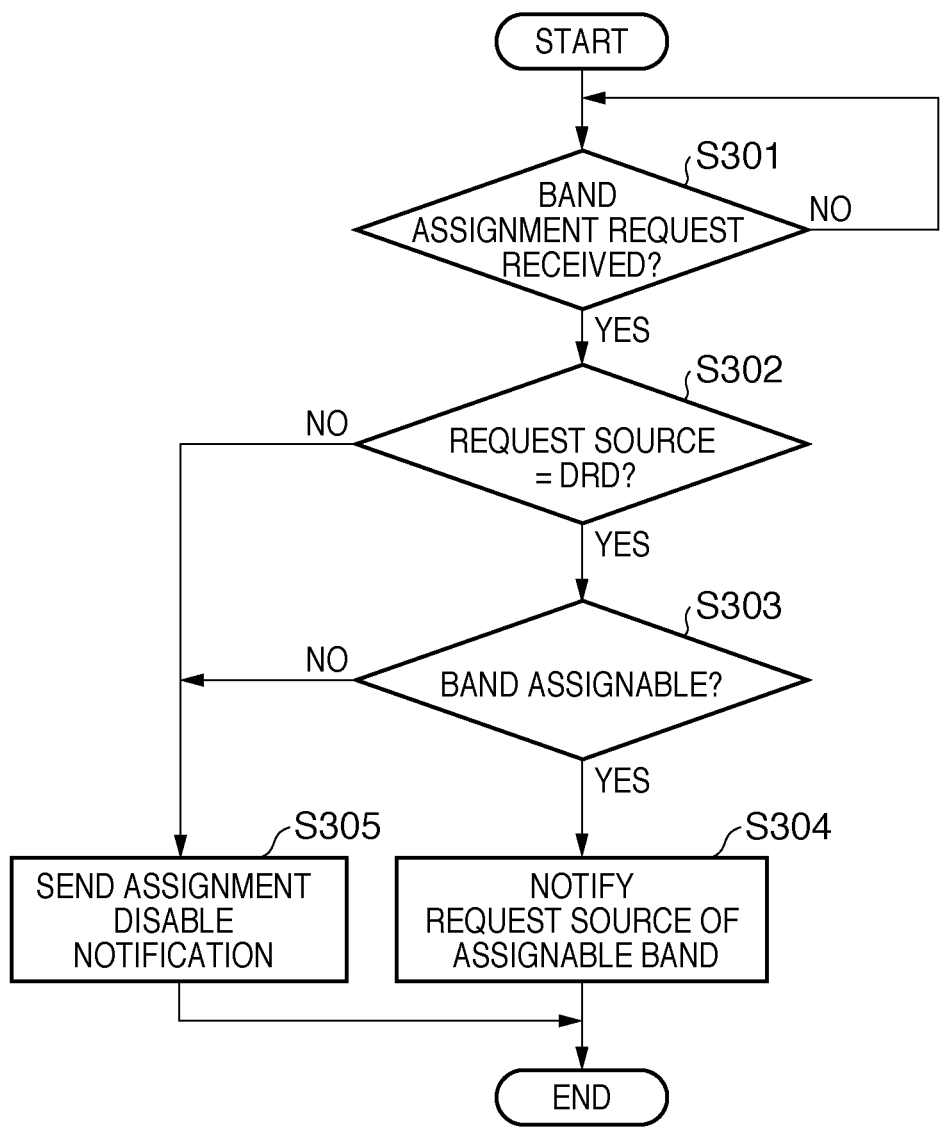
FIG. 7 is a flowchart showing an example of the operation of the PC 31 shown in FIG. 1.

An example of the operation of the PC 31 will be described next with reference to FIG. 7. An operation when a band assignment request is received from the connected printer 32 that is switching its function from a device to a host will be described.

The PC 31 causes the host control unit 202 to receive the band assignment request (YES in step S301), and causes the determination unit 205 to determine whether the band assignment request source is a DRD. If the request source is not a DRD (NO in step 302), the PC 31 causes the host control unit 202 to send an assignment disable notification (step S305).

If the request source is a DRD (YES in step 302), the PC 31 checks whether the band acquired by itself is sufficiently wider than the band requested to be assigned, and determines the assignment enable/disable state. If the band is unassignable (NO in step S303), the PC 31 causes the host control unit 202 to send an assignment disable notification (step S305). If the band is assignable (YES in step S303), the PC 31 causes the host control unit 202 to send an assignment enable notification (step S304). If the band is assignable, the PC 31 notifies the printer 32 of, as the assignable band, a band that has been ensured for communication with it.

As described above, according to this embodiment, when a terminal station having a DRD function switches its operation state (from a device to a host), a host to which the terminal station is connected as a device assigns a band ensured by the host. This makes it possible to reliably ensure a communication band even when a terminal station having a DRD function switches its operation state (from a device to a host).

It is also possible to effectively use the bands because hosts associated by communication assign exclusive bands (not to be used simultaneously) to each other.

Typical embodiments of the present invention have been described above. However, the present invention is not limited to the aforementioned and illustrated embodiments, and can be properly modified without departing from the scope of the invention.

Figure 8:
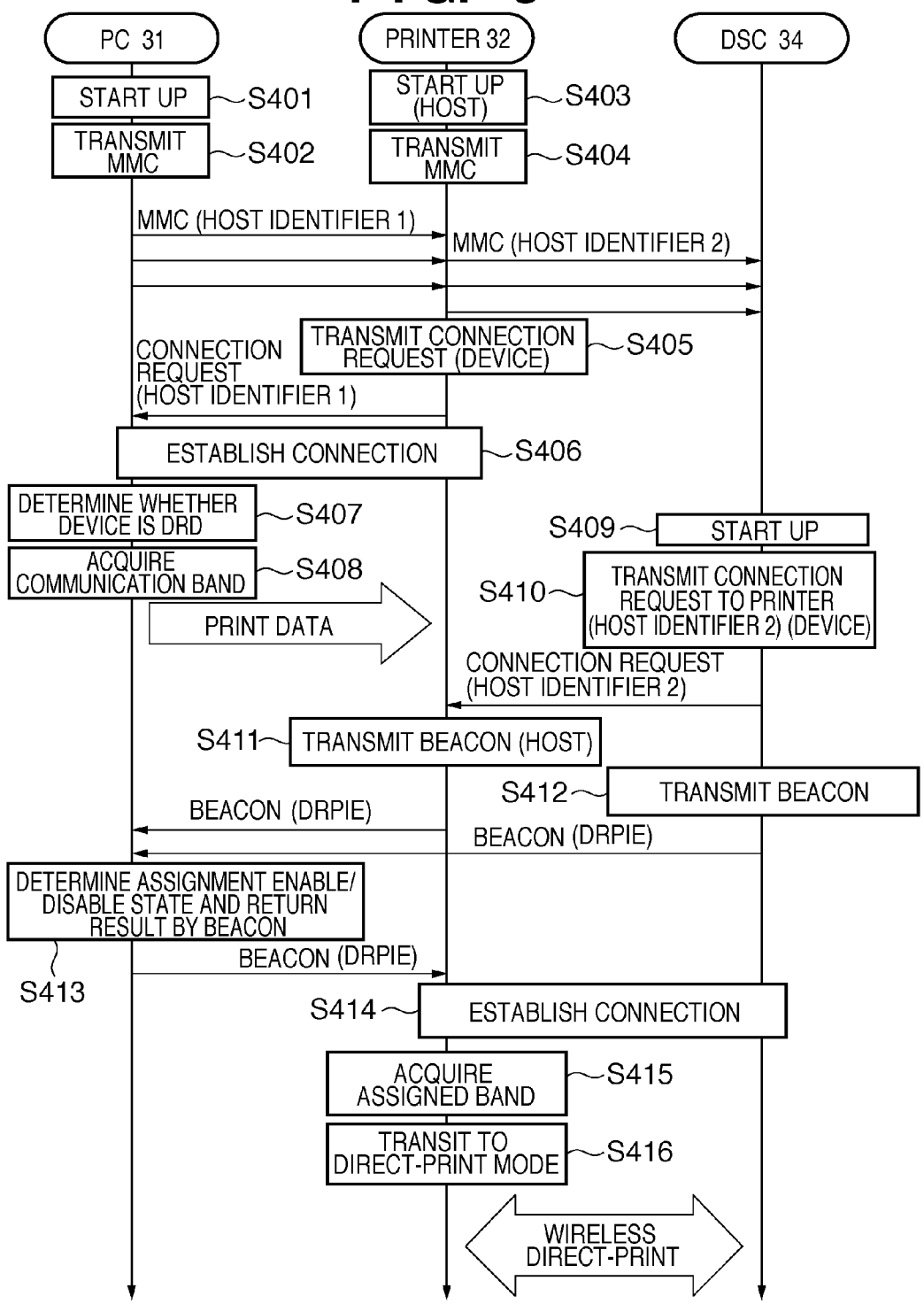
FIG. 8 is a sequence chart showing an example of the sequence of the connection operation of a communication system according to a modification.
Figure 9:
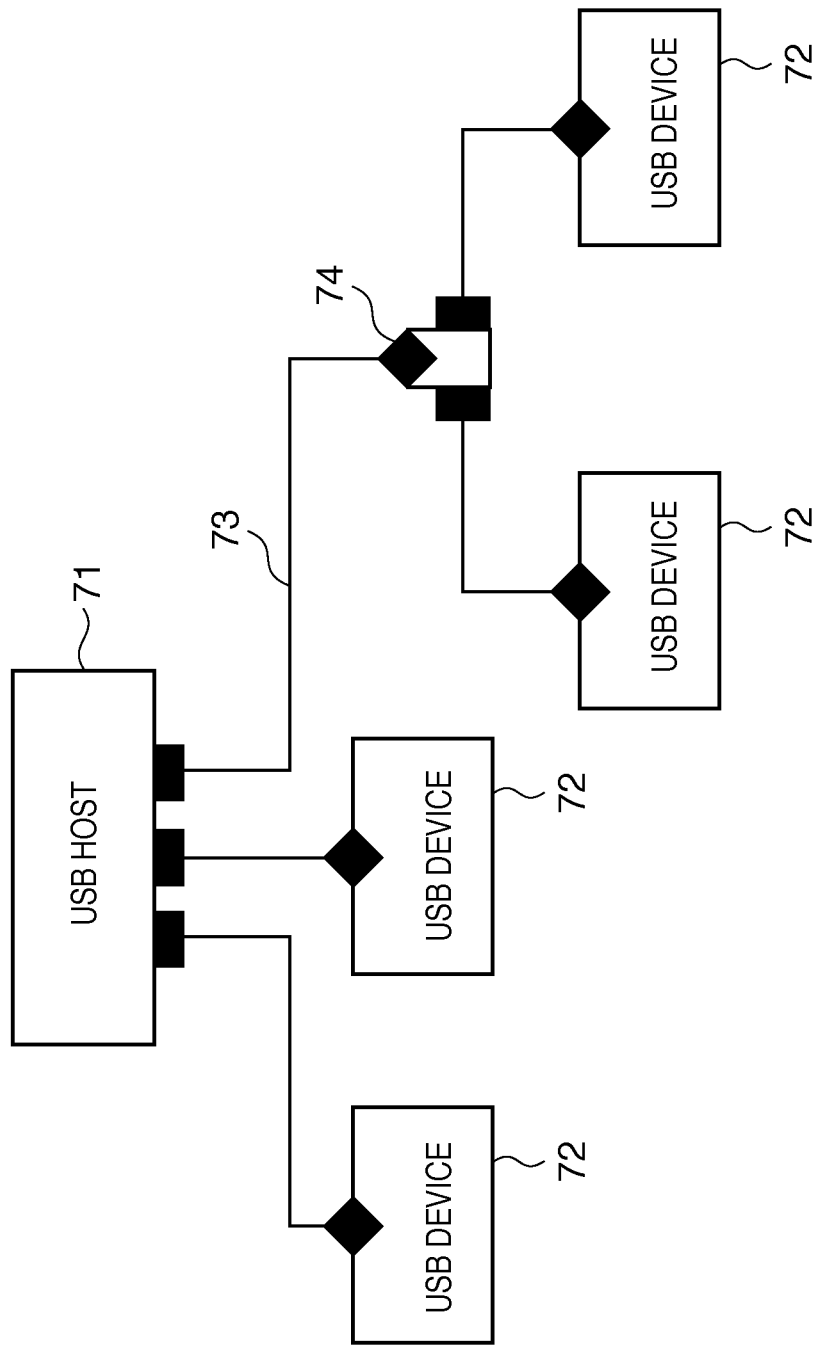
FIG. 9 is a block diagram showing an example of a system arrangement using USB.
Figure 10:
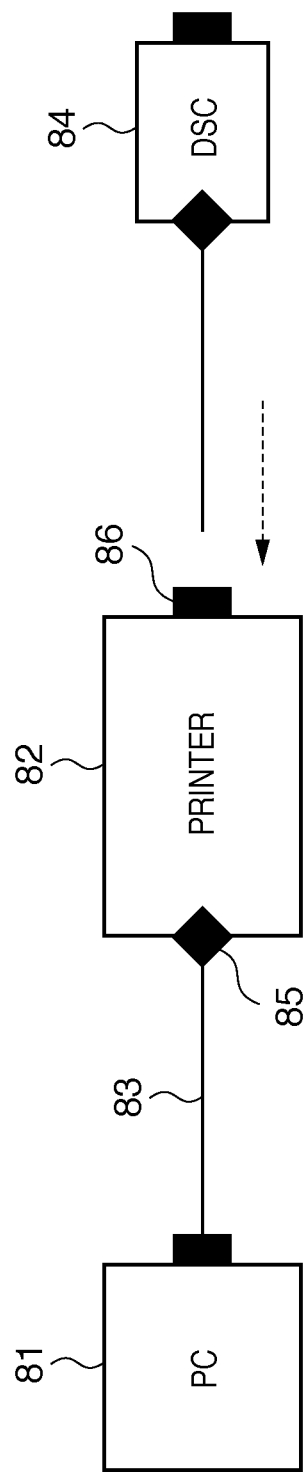
FIG. 10 is a block diagram showing an example of the system arrangement of a direct-print method.
Figure 11:
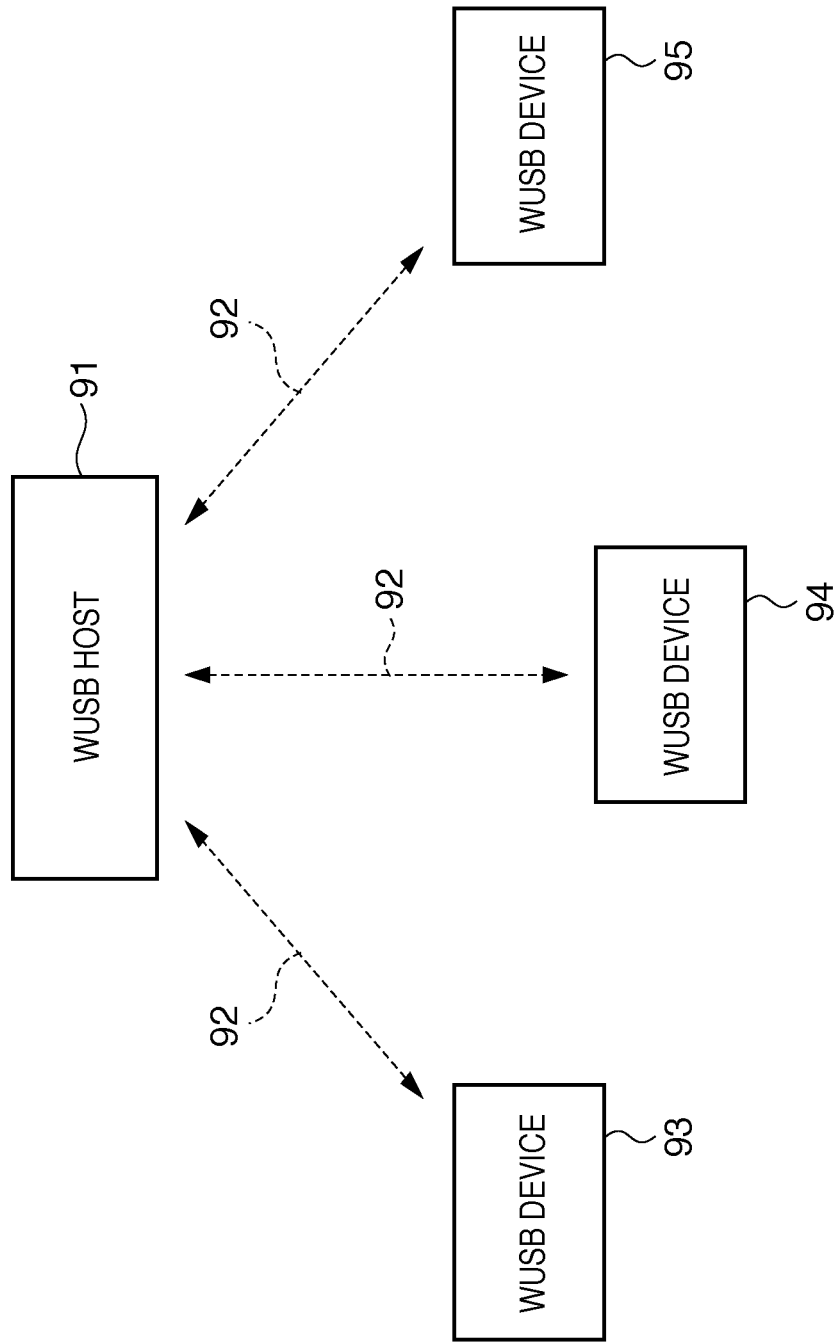
FIG. 11 is a block diagram showing an example of a system arrangement using WUSB.
Figure 12:
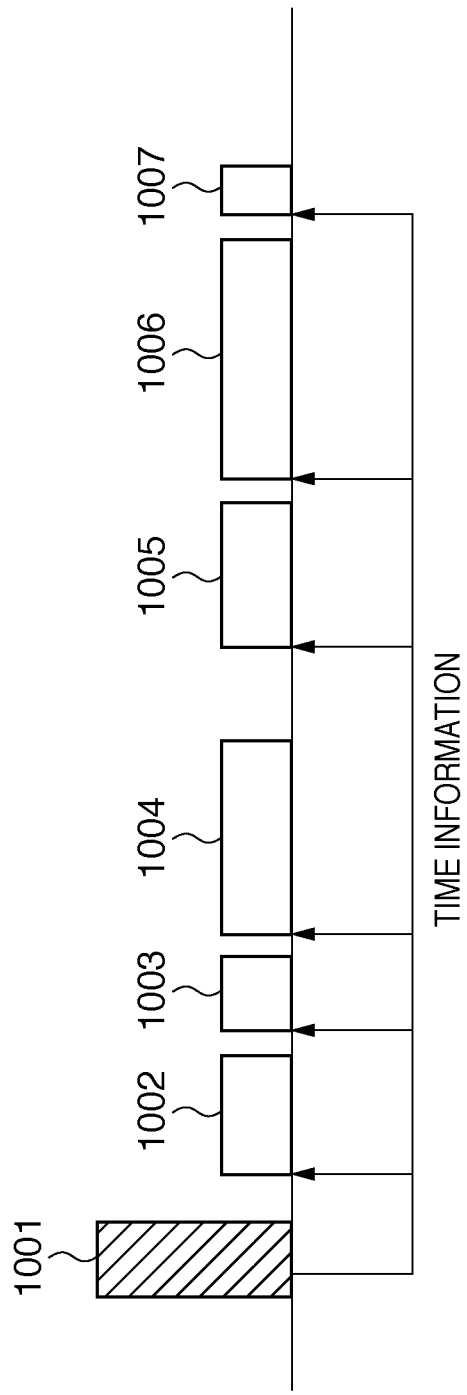
FIG. 12 is a timing chart showing examples of the timings of wireless frames transmitted via WUSB wireless links 92 shown in FIG. 11.
Figure 13:
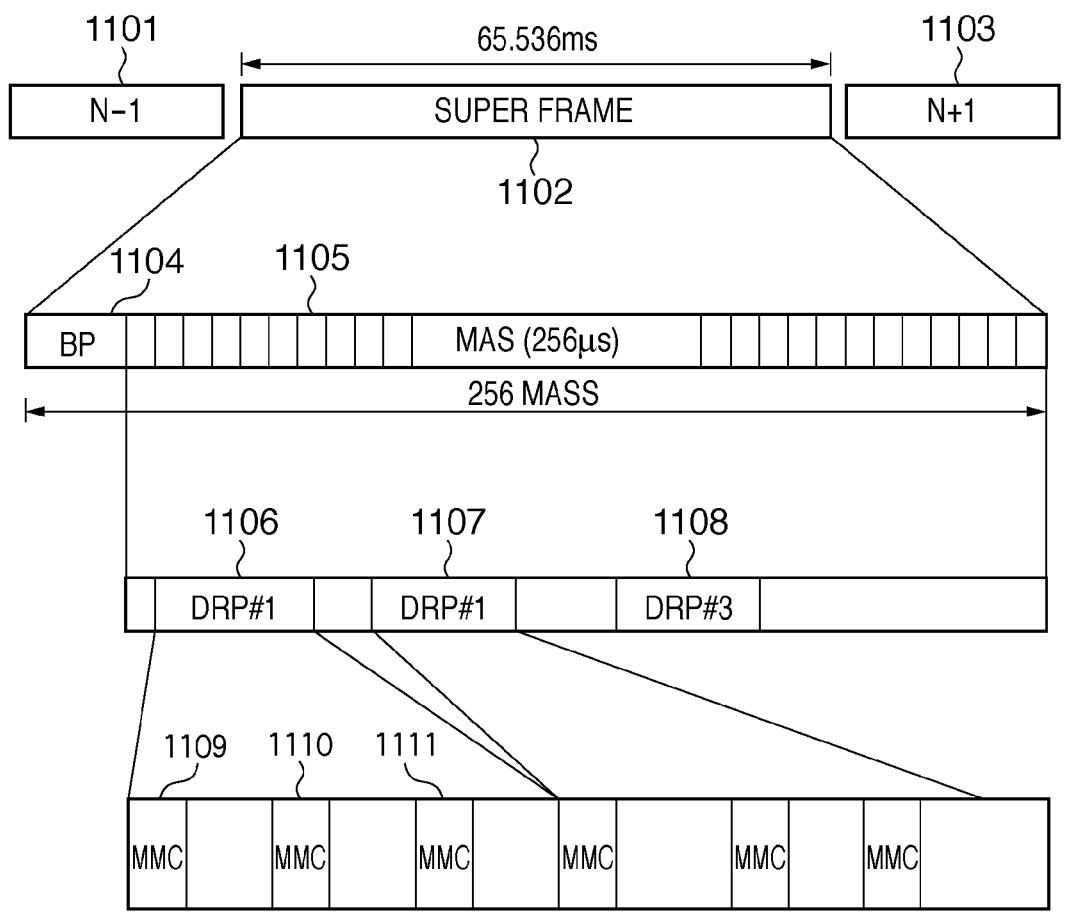
FIG. 13 is a view showing an example of a wireless frame of a MAC layer.
Figure 14:
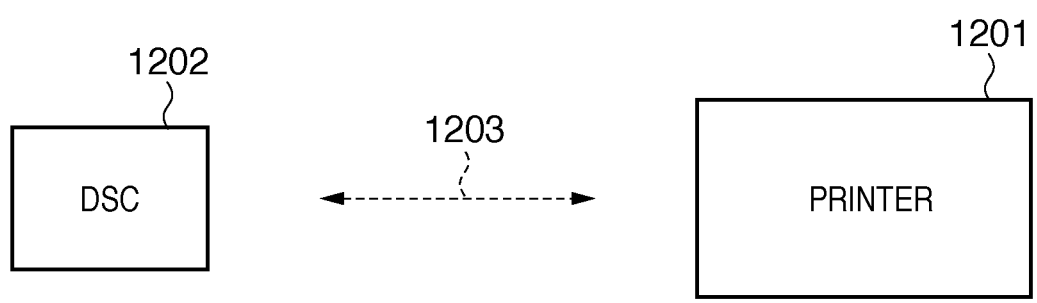
FIG. 14 is a block diagram showing an example of the system arrangement of a direct-print method using WUSB.
Figure 15:
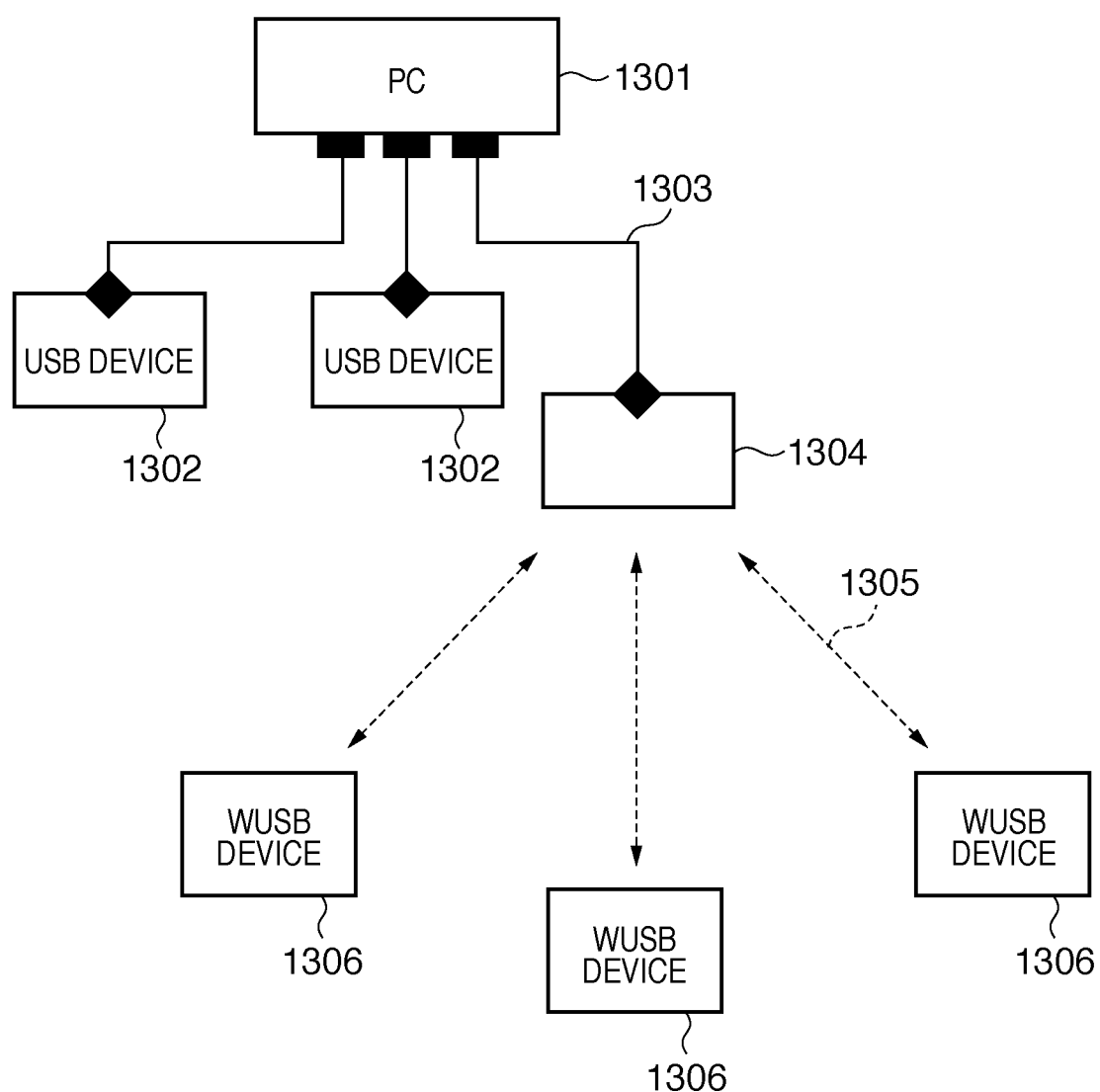
FIG. 15 is a block diagram showing an example of a system arrangement including a device having an adapter function.
Figure 18:
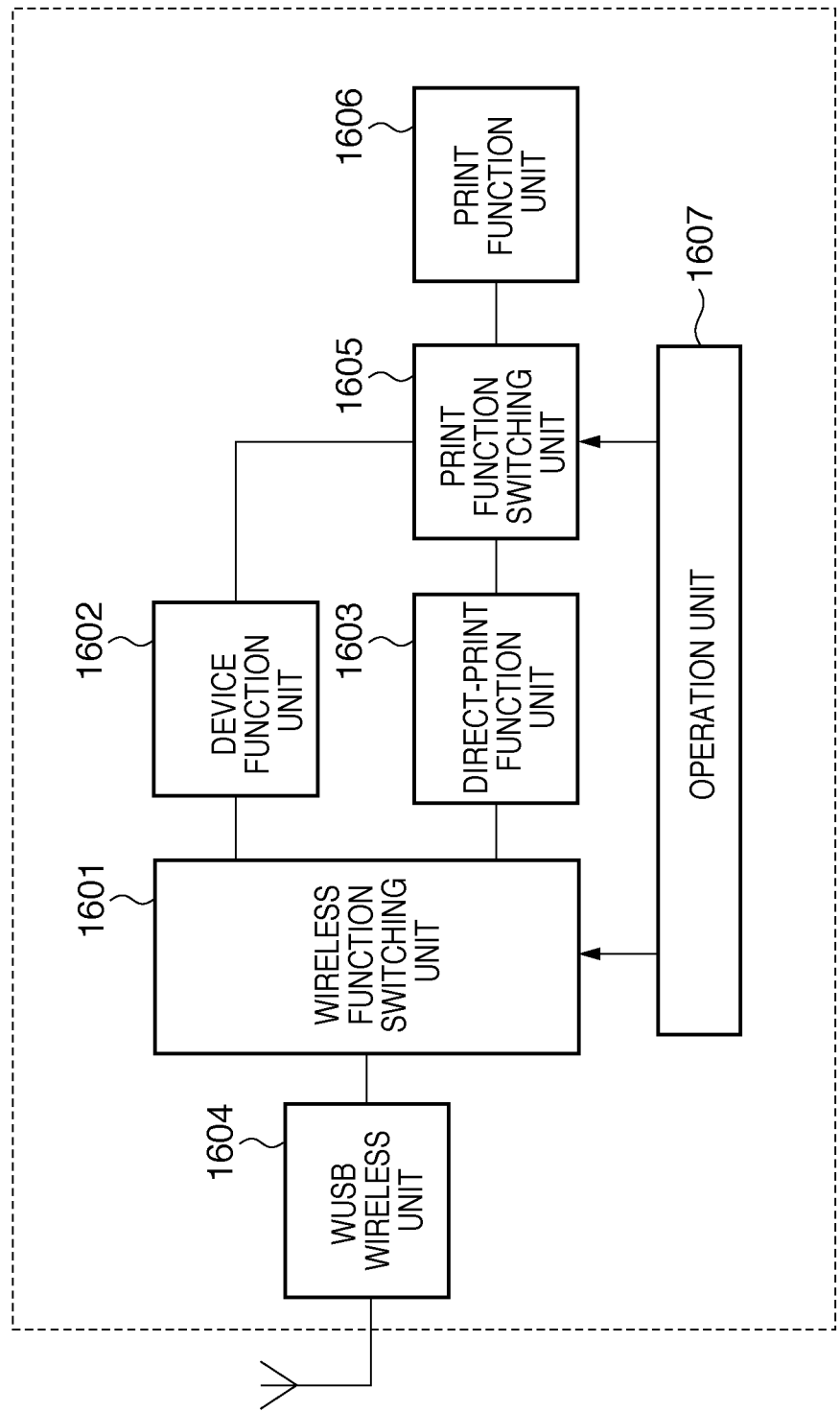
FIG. 18 is a block diagram showing an example of the internal arrangement of a printer 1504 shown in FIG. 17.

For example, in the above-described embodiment, the PC 31 and the printer 32 exchange a band assignment request and a response to it in band assignment. Instead of exchanging a band assignment request and a response to it, a beacon (annunciation signal) may be used. In this case, as shown in FIG. 8, the DSC 34 transmits a connection request to the printer 32 (step S410), and starts transmitting a beacon (step S412). Upon receiving the connection request from the DSC 34, the printer 32 starts transmitting a beacon (step S411). The beacon includes a DRP information element (DRPIE) as information relating to the communication band. Upon receiving the beacon, the PC 31 determines based on the DRP information element (DRPIE) whether the printer 32 has acquired a necessary band (e.g., a band to be used for direct-print). Then, the PC 31 performs the assignment enable/disable state determination and the like in the above-described way, and transmits the result in a beacon (step S413). This enables the same processing as described above.

The present invention can adopt embodiments in the forms of, for example, a system, apparatus, method, program, and storage medium. The present invention may be applied to either a system constituted by a plurality of devices, or an apparatus consisting of a single device.

The present invention includes a case wherein the functions of the aforementioned embodiments are achieved when a software program is directly or remotely supplied to a system or apparatus, and a computer incorporated in that system or apparatus reads out and executes the supplied program codes. The program to be supplied in this case is a computer program corresponding to the illustrated flowcharts in the embodiments.

Therefore, the program codes themselves installed in a computer to implement the functional processing of the present invention using the computer also implement the present invention. That is, the present invention includes the computer program itself for implementing the functional processing of the present invention. In this case, the form of program is not particularly limited, and an object code, a program to be executed by an interpreter, script data to be supplied to an OS (Operating System), and the like may be used as long as they have the functions of the program.

As a computer-readable storage medium for supplying the computer program, various media can be used. As another program supply method, the user establishes connection to a website on the Internet using a browser on a client computer, and downloads the computer program of the present invention from the website onto a recording medium such as a hard disk.

The functions of the aforementioned embodiments can be implemented when the computer executes the readout program. In addition, the functions of the aforementioned embodiments may be implemented in collaboration with an OS or the like running on the computer based on an instruction of that program. In this case, the OS or the like executes some or all of actual processes, which implement the functions of the aforementioned embodiments.

As described above, according to the present invention, a terminal station which switches its operation state from the second mode (device function) to the first mode (host function) can acquire a communication band more reliably as compared to a case without the processing of the above-described arrangement.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-116300 filed on Apr. 25, 2008, which is hereby incorporated by reference herein in its entirety.

What is claimed is:

1. A communication system including a first terminal station which has a host function of controlling communication, and a device function controlled by the host function, and a second terminal station which operates by the host function,
   the second terminal station comprising:
      a determination unit configured to determine whether a connected terminal station is the first terminal station; and
      a control unit configured to, if the terminal station determined to be the first terminal station by said determination unit has acquired no communication band yet when starting an operation by the host function, assign at least part of a communication band acquired by the second terminal station to the first terminal station, and
   the first terminal station comprising:
      a host unit configured to operate by the host function when the first terminal station connected to the second terminal station by the device function has received a connection request from a third terminal station which operates by the device function;
      an acquisition unit configured to, when starting an operation by the host function, acquire the communication band assigned by the second terminal station as a communication band for the third terminal station; and
      a request unit configured to, when starting an operation by the host function, request the second terminal station to assign a communication band, if a communication band to be used for communication with the third terminal station cannot be acquired, and said control unit assigns at least part of the communication band acquired by the second terminal station to the first terminal station in response to the connection request from said request unit.

2. The system according to claim 1, wherein said control unit does not assign the communication band acquired by the second terminal station to a terminal station determined to not be the first terminal station by said determination unit.

3. The system according to claim 1, wherein the first terminal station further comprises a transmission unit configured to transmit an annunciation signal including information relating to the communication band, and said control unit assigns at least part of the communication band acquired by the second terminal station to the first terminal station upon determining based on the annunciation signal from said transmission unit that the first terminal station has acquired no communication band yet.

4. The system according to claim 1, wherein said control unit assigns, out of the communication band acquired by the second terminal station, a communication band acquired to be used for communication with the first terminal station to the first terminal station.

5. The system according to claim 1, wherein the communication band is managed, using distributed control, by the terminal station which operates by the host function.

6. A control method in a communication system including a first terminal station which has a host function of controlling communication, and a device function controlled by the host function, and a second terminal station which operates by the host function, the method comprising:
   causing the second terminal station to assign at least part of a communication band acquired by the second terminal station to the first terminal station when the first terminal station connected to the second terminal station by the device function starts an operation by the host function;
   causing the first terminal station to acquire the communication band assigned by the second terminal station when the first terminal station connected to the second terminal station by the device function starts an operation by the host function; and
   when starting an operation by the host function, causing the first terminal station to request the second terminal station to assign a communication band, if a communication band to be used for communication with a third terminal station cannot be acquired, and causing the second terminal station to assign at least part of the communication band acquired by the second terminal station to the first terminal station in response to a connection request from the third terminal station.

7. A communication apparatus comprising:
   a first communication unit configured to communicate with a first control apparatus using a first communication band assigned by the first control apparatus;
   a determination unit configured to determine whether a second communication band can be acquired to perform a communication between the communication apparatus and an other communication apparatus;
   a request unit configured to transmit a request for a third communication band to the first control apparatus, in a case that a determination is made by the determination unit that the second communication band cannot be acquired; and an assignment unit configured to assign, as a second control apparatus, the third communication band acquired from the first control apparatus, based on a response to the request transmitted by the request unit, for communicating with the other communication apparatus.

8. The apparatus according to claim 7, wherein the third communication band is at least part of the first communication band.

9. The apparatus according to claim 7, further comprising a second communication unit configured to communicate with the other communication apparatus using the third communication band as the second control apparatus.

10. The apparatus according to claim 9, wherein the second communication unit communicates with the other communication apparatus using the third communication band as the second control apparatus, in response to a connection request from the other communication.

11. The apparatus according to claim 7, further comprising a notification unit configured to notify that a necessary communication band cannot be acquired, if a determination is made by the determination unit that the second communication band can not be acquired.

12. The apparatus according to claim 7, wherein, in a case that determining whether the second communication band can be acquired, the determination unit performs a determination using a distributed reservation protocol method.

13. A method performed by a communication apparatus, the method comprising:

communicating with a first control apparatus using a first communication band assigned by the first control apparatus;

determining whether a second communication band can be acquired to perform a communication between the communication apparatus and an other communication apparatus;

transmitting a request for a third communication band to the first control apparatus, in a case that a determination is made that the second communication band cannot be acquired; and assigning, as a second control apparatus, the third communication band acquired from the first control apparatus, based on a response to the request for the third communication band, for communicating with the other communication apparatus.

14. A non-transitory, computer-readable storage medium storing computer-executable code that, when executed by a computer of a communication apparatus, causes the communication apparatus to perform a method comprising:

communicating with a first control apparatus using a first communication band assigned by the first control apparatus;

determining whether a second communication band can be acquired to perform a communication between the communication apparatus and an other communication apparatus;

transmitting a request for a third communication band to the first control apparatus, in a case that a determination is made that the second communication band cannot be acquired; and assigning, as a second control apparatus, the third communication band acquired from the first control apparatus, based on a response to the request for the third communication band, for communicating with the other communication apparatus.

\* \* \* \* \*